US006588452B2

(12) United States Patent
Marquart

(10) Patent No.: US 6,588,452 B2
(45) Date of Patent: Jul. 8, 2003

(54) COUPLING DEVICE FOR TRANSFERRING FLUID PRESSURE

(75) Inventor: Uwe Marquart, Bodman (DE)

(73) Assignee: Ingeborg Marquart, Bodman (DE)

( * ) Notice: Subject to any disclaimer, the term of this patent is extended or adjusted under 35 U.S.C. 154(b) by 0 days.

(21) Appl. No.: 10/013,805

(22) Filed: Dec. 7, 2001

(65) Prior Publication Data

US 2002/0121306 A1 Sep. 5, 2002

(30) Foreign Application Priority Data

Dec. 8, 2000 (DE) .......................... 100 61 953

(51) Int. Cl.[7] .............................................. F16L 37/30
(52) U.S. Cl. .................................. 137/614; 137/614.05
(58) Field of Search ............................ 137/614, 614.03, 137/614.04, 614.05

(56) References Cited

U.S. PATENT DOCUMENTS 3,550,624 A * 12/1970 Johnson ...................... 137/614
5,730,185 A * 3/1998 Wilkins et al. ..... 137/614.05 X
5,806,564 A * 9/1998 Wilcox .................... 137/614 X

FOREIGN PATENT DOCUMENTS

DE 32 28 140 A1 2/1984

* cited by examiner

Primary Examiner—Kevin Lee
(74) Attorney, Agent, or Firm—Henneman & Saunders; Larry E. Henneman, Jr.

(57) ABSTRACT

A coupling device for transferring fluid pressure from a first coupling element to a second coupling element is disclosed, wherein both coupling elements have end faces facing each other which can be moved against each other. Each coupling element comprises a cavity that runs into an opening at the end face and which may be coupled with the cavity of the other coupling element for transferring fluid. In each cavity, a piston is guided movably in axial direction, wherein both cavities have sealing surfaces facing toward the other coupling element that communicate with the opening of the end face and against which the respective piston can be moved with a counter surface for sealing. Each of both pistons is biased toward the other piston by a spring into a sealing position in which the piston rests with its counter surface against the sealing surface. A retaining room communicating with the fluid supply is provided to effect a movement of the piston into an opening position allowing the transfer of fluid pressure if the pressure in the retaining room is sufficiently high to overcome the bias of the spring.

17 Claims, 2 Drawing Sheets

COUPLING DEVICE FOR TRANSFERRING FLUID PRESSURE

FOREIGN PRIORITY

This application claims the right of foreign priority to German Application No. 100 61 953.3-24 filed on Dec. 8, 2000, which is incorporated herein by reference in its entirety.

BACKGROUND OF THE INVENTION

The invention relates to a coupling device for transferring fluid pressure from a first coupling element to a second coupling element, wherein both coupling elements comprise end faces facing each other which are movable against each other, wherein each of the coupling elements comprises a cavity that runs into an opening at the end face and which can be coupled with the cavity of the other coupling element for transferring fluid pressure, wherein in each of said cavity a piston is guided movably in axial direction, wherein both cavities at the respective side facing the other coupling element comprise a sealing surface which is connected to the opening of the end face and against which the piston is sealable by a counter surface, wherein each of the pistons is biased into the direction of the respective other piston by a biasing means toward a sealing position within which each respective piston rests by its sealing surface against the counter surface, and wherein means is provided for moving at least one of the pistons against the action of the biasing means into the direction of an opening position within which a fluid communication is enabled for transferring fluid pressure via the cavity and the opening of the end face from one coupling element into the opening of the other coupling element.

Such a coupling device is known from DE 32 28 140 A1.

In the known coupling device, each of both pistons protrudes in the sealing position outwardly beyond the sealing surface, thereby sealing with its cone surface against a mated inner cone surface of the cavity of the coupling device.

The opening of the valves formed in this way is effected when both coupling elements are moved with their sealing surface against each other, whereby both pistons come to rest against each other with their end faces and thus are axially moved with respect to the sealing position, thereby releasing a fluid communication between the outer surfaces of the pistons and the inner surfaces of the respective cavities of the coupling elements.

The known coupling device serves to connect hose or tube lines for the pressure medium supply of machines and machine parts, in particular in mining excavation facilities.

A drawback of the known device rests in the fact that the coupling is immediately opened by axial movement of the pistons, in particular before a sealed connection between both coupling elements is reached. This leads to the consequence that, before a closed connection between both coupling elements is effected, fluid, for instance oil, may leak from the coupling place, this having disadvantages.

Such coupling devices are needed for numerous applications to transfer a fluid pressure from one coupling element to another coupling element. For instance, in hydraulic clamping, it is common to separate hydraulic clamping units from the oil supply. This is done, for instance in hydraulic exchanger units, such as in clamping adapters or clamping chucks in various working machines. To this end, self-sealing coupling elements are necessary for transferring the hydraulic pressure. Herein, the coupling device shall be as tolerant as possible with respect to radial positioning errors of both coupling elements with respect to each other.

SUMMARY OF THE INVENTION

It is a first object of the invention to provide an improved coupling device for transferring fluid pressure from a first coupling element to a second coupling element.

It is a second object of the invention to provide an improved coupling device which is self-sealing when separating both coupling elements from each other.

It is another object of the invention to provide an improved coupling device which does not require exact radial positioning of the coupling elements.

It is still another object of the invention to provide an improved coupling device which is suitable to retain a high fluid pressure in a receiving coupling element when the coupling element supplying the fluid pressure is removed.

These and other objects of the invention are achieved in a coupling device of the afore-mentioned kind in that the means for moving at least one piston comprises a retaining room that acts to move the piston against the action of the biasing means into the opening position, when subjected to fluid pressure.

According to the invention, the fluid pressure itself is utilized to effect an axial piston displacement into the opening position, when both coupling elements rest against each other, thereby releasing a fluid channel between both coupling elements.

In addition, it is made possible that both pistons move into their sealing positions under the action of the biasing means, if both coupling elements are separated from each other, thereby sealing each of the coupling elements. Also a flush or recessed arrangement of the pistons, respectively, can be obtained so that no parts protrude beyond the end surface. Thereby, the danger of damage and of contamination to each coupling element is reduced considerably. At the same time, it is avoided that fluid may leak from input or output pipes already under pressure during effecting the coupling connection According to a further development of the invention, the piston of at least one of the coupling elements is terminated at its end facing the other coupling element by a head section which comprises the counter surface coacting with the sealing surface and which is terminated at its end face by a head surface that faces the other coupling element.

Thereby, a fluid pressure which can be transferred in the opening position via a gap between the counter surface and the sealing surface can act beyond the opening of one coupling element onto the end face of the other coupling element, to thereby displace the latter against the action of its biasing device into the opening position. Thus, by the fluid pressure of one coupling element supplying the fluid pressure, the piston of the other coupling element can be moved into the opening position. Thereby, the coupling element receiving the fluid pressure closes by its own under action of its biasing device, if the coupling element supplying the fluid pressure is closed or removed from the other coupling element, respectively.

In an advantageous improvement of this design, the head face is made substantially flush or recessed with respect to the end face of the coupling element when being in the sealing position.

This allows to make the surfaces of the coupling elements completely flat, thus substantially reducing the danger of contamination.

According to an improvement of the invention, at least one piston of the coupling elements comprises a central fluid channel which communicates via a connecting channel with the retaining room, the central fluid channel being provided between the wall of the cavity and the piston to effect a movement of the piston against the action of the biasing means into the opening position, if subjected to fluid pressure, within the opening position a fluid communication from the central fluid channel to the opening of the end face of the other coupling element being provided via the connecting channel, the retaining room and a gap between the sealing surface and the counter surface toward the opening of the end face of the other coupling element.

Thereby, a particularly simple and reliable construction is achieved.

According to a further development of the invention, the biasing device of at least one of the coupling elements is configured as a spring means which is being fixed between the piston and a terminating element that is mounted at the side of the wall of the cavity opposite the other coupling element.

By this measure, a strike limitation for the piston can be effected in a particularly simple way.

According to a further development of the invention, the piston of at least one coupling element comprises a hollow cylindrical extension arranged at the end opposite the other coupling element, the outer surface of which is guided displaceably in a bore of the terminating element and is configured sealed thereto.

With these features the fluid transfer through the central fluid channel within the hollow cylindrical extension into the retaining room can be effected in a simple way.

According to a further development of the invention, the sealing surface at the end of the cavity of at least one of the coupling elements is configured as an inner cone surface following to the retaining room and running into the opening at the end face of the coupling element, wherein the counter surface of the piston is configured as an outer cone surface mated thereto.

Thereby, the communication between the retaining room and the sealing surface and the counter surface can be effected in a particularly simple way.

According to an additional development of the invention, the cavity of at least one of the coupling elements is arranged in a coupling insert that is received in a recess of a base body.

Thereby, the assembly of the respective parts to the coupling element is substantially simplified.

According to a further embodiment of the invention, a sealing element, preferably an annular sealing, is provided at the end face of at least one of the coupling elements, for sealing the region about both openings in the sealing position.

If both end faces of the coupling elements rest against each other, thereby a sealing of the region surrounding the opening of the coupling elements to the outside can be effected so that fluid pressure from one coupling element can be transferred to the other coupling element without leakage.

In a preferred improvement of the invention, both coupling elements are configured substantially identical and arranged symmetrical to each other, apart from the sealing element at the end face of one coupling element.

Thereby, the design of the coupling device is substantially simplified, since rather identical parts can be utilized for both coupling elements.

According to a further embodiment of the invention, the biasing device of the coupling element supplying the fluid pressure has a lower retention force than has the biasing device of the other coupling element.

In case the fluid supply is interrupted, thereby it can be guaranteed that first the piston of the other coupling is moved back into the sealing position before also the piston of the coupling element supplying the fluid pressure is closed. Thereby, it is ensured that any leakages after separation of both coupling elements can be avoided substantially.

It should be understood that the afore-mentioned features and the features to be subsequently explained cannot only be used in the given combination, but also in other combinations, or by its own, without leaving the scope of the invention.

BRIEF DESCRIPTION OF THE DRAWINGS

Further features and advantages of the invention can be seen from the following description of a preferred embodiment with reference to the drawings in which.

DETAILED DESCRIPTION OF THE PREFERRED EMBODIMENT

Figure 1:
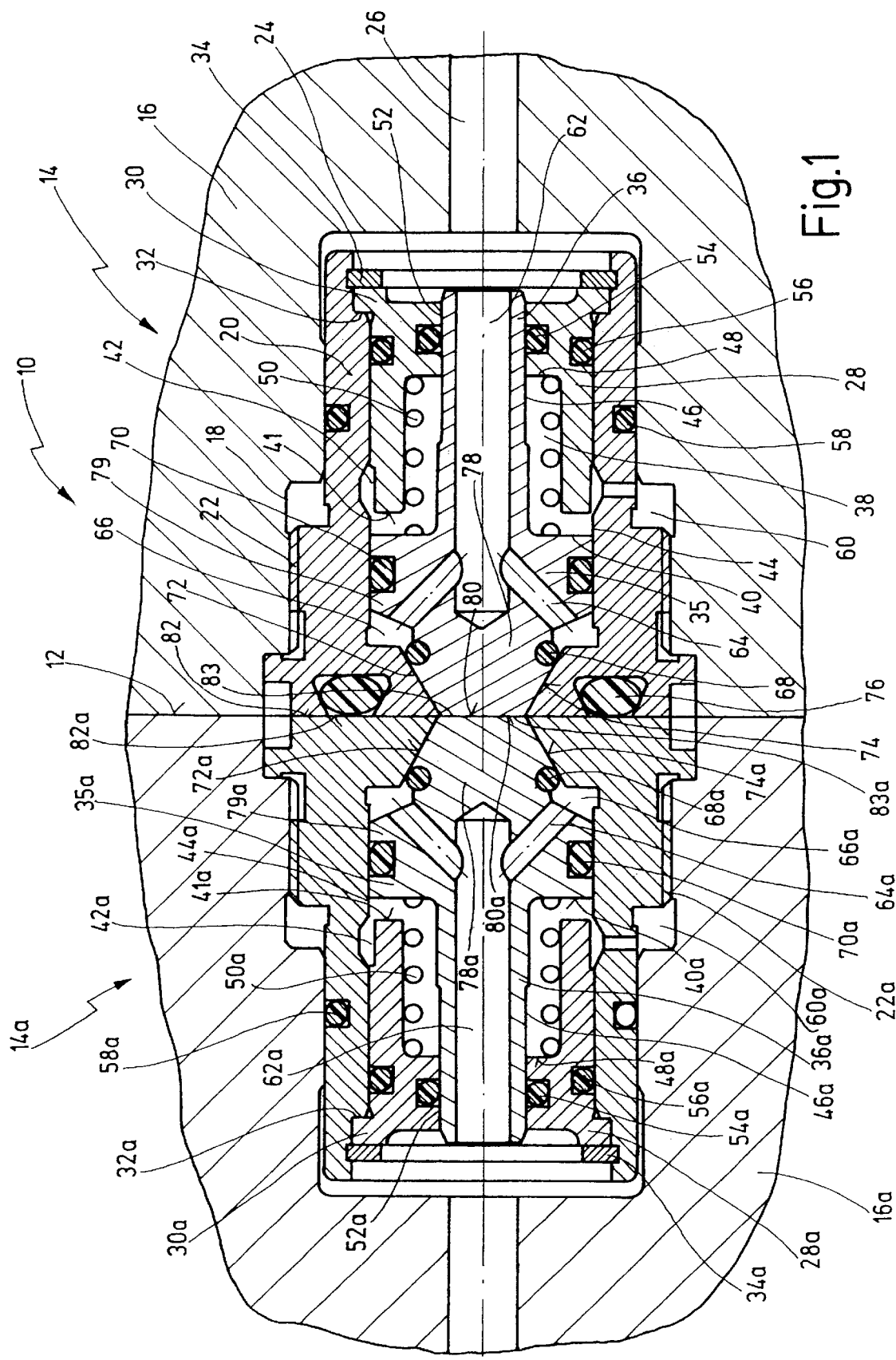
FIG. 1 shows a section of the coupling device according to the invention, wherein both coupling elements rest with their sealing surfaces sealingly against each other, however both pistons still being in a sealed position.

In FIG. 1 a coupling device for transferring a fluid pressure according to the invention is denoted in total with reference numeral 10.

The coupling device comprises a first coupling element 14, having a fluid channel 26 which may be fed with pressurized fluid from a source not shown. The coupling device 10 further comprises a second coupling element 14a within which at the opposite rearward end a fluid channel 26a is provided for receiving the fluid pressure. The second coupling element 14a may, for instance be, be provided on a clamping adapter or a clamping chuck to be supplied with fluid pressure from the first coupling element 14 and wherein the fluid shall be stored under pressure after the first coupling element has been removed. The device to be supplied could also be a robot which shall be supplied with pressurized air.

The two coupling elements 14, 14a are movable to each other, e.g. the first coupling element 14 may be stationary, while the second coupling element 14a is movable, or the other way round.

Both coupling elements 14, 14a are terminated, at each end facing the respective other coupling element, by a plane end face. In the position shown in FIG. 1, both coupling elements 14, 14a sit close to each other with their end faces 82, 82a, wherein a sealing between both end faces 82, 82a is effected by an annular sealing 76 within the region surrounded by the sealing ring which is received within the end face 82 of the first coupling element 14 in a recessed way.

Apart from this sealing ring 76 both coupling elements 14, 14a are configured identical and are arranged symmetrical to each other.

Therefore, in the following only the structure of the first coupling element is described, while with respect to the second coupling element 14a only the differences to the first coupling element are given.

For corresponding elements of the second coupling element 14a like reference numerals will be used followed by an a.

Within the first coupling element 14 an almost cylindrical recess 18 is provided, the wall of which is provided with several steps. A cavity within base body 16 of the first coupling element 14 is formed by this recess that is limited by an end face 24 at its end opposite the other coupling element 14a. The afore mentioned fluid channel 26 which may be coupled to a fluid source, e.g. a pressurized hydraulic fluid reservoir, runs into this end face 24.

A coupling insert 20 is screwed into a thread 22 provided in the wall of the recess, the coupling insert being open at its rearward end facing the end face 24, and being terminated at its second side facing the second coupling element by a conical sealing face 72 that runs into an opening 83 at the end face 82 14a.

To avoid a leaking of fluid from the recess 18 within base body 16 at the end face 82, the couling insert 20 is sealed against the base body 16 by a sealing, for instance by an O-ring 58.

Within the cavity 42 a piston 35 is guided movably in axial direction. The piston 35 comprises at its end, facing the other coupling element, a head section 78 the outer surface of which facing the other coupling element 14a is provided with an outer cone that acts as a counter surface 74 with respect to the sealing surface 72 of the coupling insert. The head section 78 is terminated at its outer end facing the other coupling element 14a by a planar head surface 80 which, in the sealing position shown in FIG. 1, is almost flush with the end face of the coupling insert 20. The head section 78 is followed by a flange section 79 of larger diameter by which the piston 35 is guided along the wall 44 of cavity 42. At its rear face opposite the other coupling element 14a the flange section 79 is limited by a radial surface 40 from which a hollow cylindrical extension 36 extends into the direction of the fluid channel 26. In the rear half of the cavity 42 a pot-like terminal element 28 is received and secured at its rear end at a radial protrusion 30 by a securing ring 34 which rests against a shoulder 32 of wall 44. The pot-like terminal element 28 is open at its side pointing toward the other coupling element 14a and is penetrated by a central bore 52 within which the piston 35 is guided with the outer surface 46 of its hollow cylindrical extension 36 and is sealed by an O-ring 54.

Within piston 35, a central fluid channel 62 is provided which is configured as a blind bore that extends into the hollow cylindrical extension 36 and ends in the region of the head section 78. This central fluid channel 62 is connected via two slanted connecting channels 64 with a retaining room 66 which is formed between the wall 44, the flange section 79 and the beginning of the counter surface 74 on the head section 78.

Thus, in the sealing position shown in FIG. 1, the fluid channel 26 is connected to the retaining room 66 via central channel 62 of piston 35 and via fluid channels 64.

In the sealing position shown in FIG. 1, this retaining room 66 is sealed against opening 83 of head face 82 by the counter surface 74 of head 78 which rests against sealing surface 72, wherein a reliable sealing is guaranteed by an O-ring 68 which is recessed in the head section 78. The retaining room 66 is sealed toward the backward end by a flange section 79 of head section 78, wherein a sealing ring 70 being recessed in the outer surface of flange section 79 and resting against the wall 44 of cavity 42 ensures a reliable sealing.

As mentioned before, the piston 35 is guided with its flange section 79 along the wall 44 of cavity 42 and with the outer surface 36 of its hollow cylindrical extension 36 within bore 52 of the pot-like terminating element 28.

While the movement of piston 35 toward the second coupling element 14a is limited by resting of the O-ring 68 and the counter surface 74 against sealing surface 72, the movement of piston 35 into the opposite direction is limited by a stop surface 41 which forms the end of the pot-like terminating element 28 and against which the flange section 79 can strike with its rear radial surface 40.

Between the radial surface 40 of flange section 69 and the opposite end of pot-like terminating element 28, a spring element 50 having the form of a coil spring is held which biases the piston 35 toward the other coupling element 14a.

To avoid a leakage of fluid from fluid channel 26 into a receiving space 38 which is formed between radial surface 40 of flange section 39 and pot-like terminating element 28, the pot-like terminating element 28 is sealed at its outer surface against the wall 44 of cavity 42 by a sealing, e.g. by an O-ring 56. If still fluid should leak into the receiving space 38, this fluid may be removed via a removing channel 60 toward the outside into a fluid sump.

As mentioned before, the second coupling element 14a is completely identical to the first coupling element 14 and is arranged symmetrical thereto, with the exception of deviations to be explained in the following. Therefore, the description of the structure of the second coupling element 14a is not repeated, like elements being designated by like reference numerals followed by a.

The first deviation from the first coupling element 14 rests in the fact that sealing ring 76 is provided recessed within an end face 82 only of the first coupling element 14, while in the end face 82 of the second coupling element 14a, no such sealing ring is provided.

The second deviation rests in the fact that spring element 50 of the first coupling element 14 has a somewhat smaller spring force than has the spring element 50a of the second coupling element 14a which may be achieved by a somewhat smaller spring constant, while keeping the same dimensions.

The function of the coupling device 10 will be explained in the following.

In the position shown in FIG. 1, both coupling elements 14, 14a are moved toward each other, until both end faces 82, 82a rest against each other in a separating plane 12, wherein it is ensured by a suitable guidance in radial direction that both openings 83, 83a are aligned with each other. Due to the design according to the invention, a precise radial alignment is not necessary; it is sufficient when radial positioning errors of more than roughly two millimeters are avoided.

In the sealing position shown in FIG. 1, the region surrounding both openings 83, 83a is sealed by O-ring 76 which is pressed against the end face 82a of the second coupling element 14a.

If the fluid channel 26 is pressureless, for instance when a respective valve of a link to a pressure reservoir is closed, then the piston 35 will be pressed with its counter surface 74 against sealing surface 72 by the spring 50 so that no fluid may leak through the opening 83. In this position, also the fluid channel 26a of the other coupling element 14a may be pressureless or may already obtain a greater pressure level which may haven been reached by an earlier pressure transmission, for instance. In both cases, the piston 35a is held by its spring 50a in the sealing position.

If now fluid shall be transferred from the first coupling element 14 to the second coupling element 14*a*, then only the pressure supply to fluid channel 26 must be opened.

The fluid now enters via fluid channel 26 into central fluid channel 62 of piston 35 and via the lateral connecting channels 64 into retaining room 66.

Figure 2:
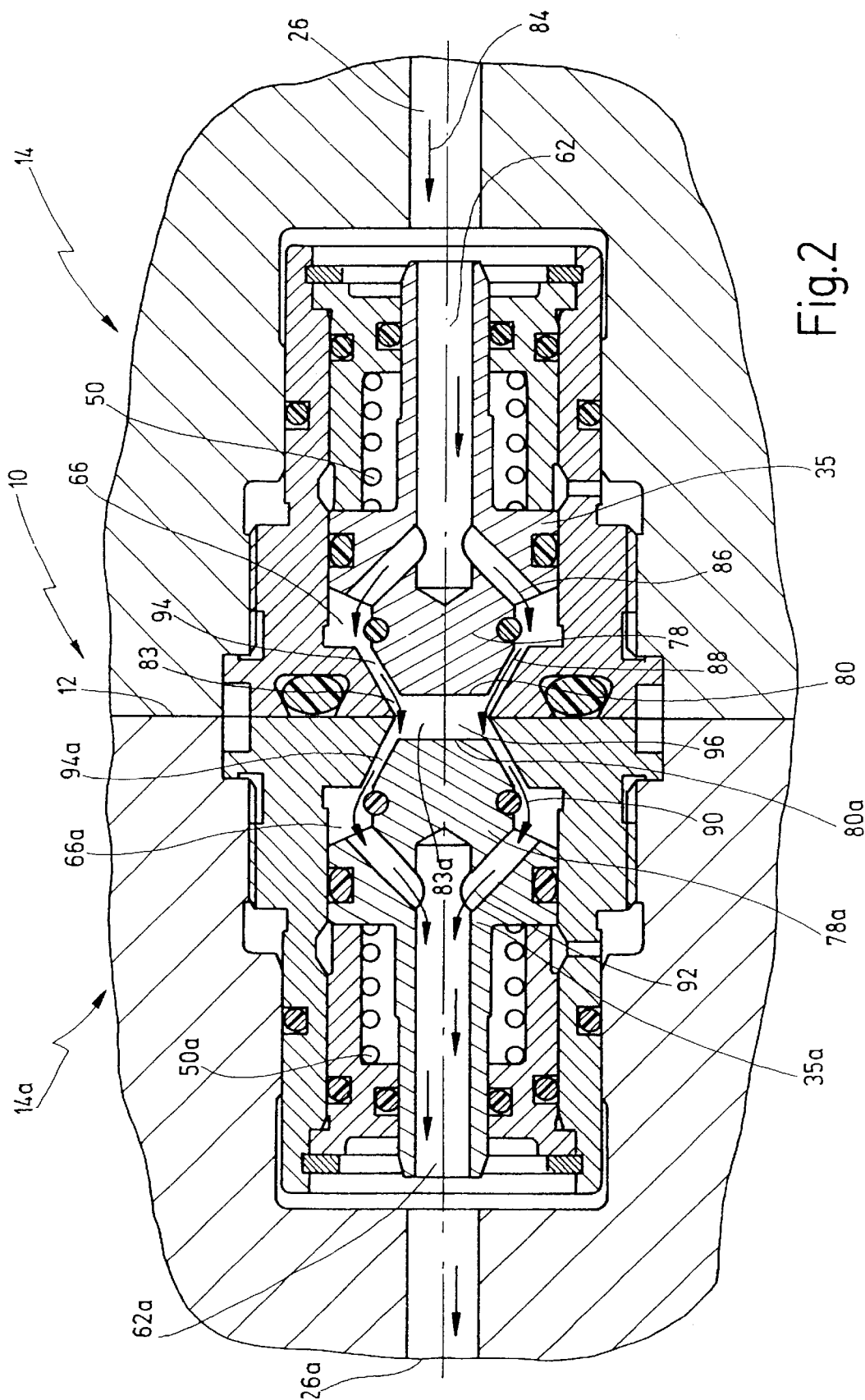
FIG. 2 shows a section of the coupling device of FIG. 1, wherein both pistons are now in an opening position in which a fluid pressure is transferred from the first piston to the second piston.

If the fluid pressure in retaining room 66 is sufficiently large to overcome the force of spring element 50, then the piston 35 moves toward the right, until the latter strikes with its radial surface 40 against stop face 41 of the pot-like terminating element 28. By the axial displacement of piston 35, a gap 94 between the sealing surface and the counter surface is created. Thus now, according to FIG. 2, fluid can emerge into the direction of arrows 84, 86, 88 toward the head face 80*a* of piston 35*a* of the second coupling element 14*a*. Thus, the fluid pressure acts in the space 96 between both head faces 80, 80*a*, thereby a respective force in axial direction is exerted onto piston 35*a*. If the fluid pressure within fluid channel 26 and thereby also in space 96 is sufficiently high to overcome the force of spring element 50*a*, the piston 35*a* moves to the left according to FIG. 2. Thereby fluid can now flow without any obstacle into the direction of arrows 90, 92 into the fluid channel 26*a* of the second coupling element 14*a*. Thereby, now the fluid pressure in fluid channel 26*a* can be raised up to a given target pressure.

If now the fluid supply through channel 26 of the first coupling element 14 is stopped, for instance by closing a respective valve, then in the beginning piston 35*a* is moved under action of its spring element 50*a* to the right into the sealing position so that the gap 94*a* between sealing surface 70*a* and counter surface 74*a* is closed. Due to the somewhat smaller spring force of spring 50, the piston 35 of the first coupling element will move into the sealing position with a certain time lag so that an additional emerging of fluid via opening 83 will be avoided.

Both coupling elements 14, 14*a* now may be separated at the separating line 12, the sealing being ensured by its own due to both pistons 35, 35*a*.

What is claimed is:

1. A coupling device for transferring fluid pressure from a first coupling element to a second coupling element, wherein said first coupling element comprises:
   a first end face facing the second coupling element;
   a first opening within the first end face extending into a first cavity extending through the first coupling element in axial direction;
   a first piston being guided displaceably in axial direction within said first cavity between a sealing position and an opening position;
   a first sealing surface configured as an inner cone surface extending from said first opening of said first end face into said first cavity;
   a first counter surface being configured as an outer cone surface arranged on a first end of said first piston facing the first end face and coacting with said first sealing surface to seal said first cavity from said first opening, when being in said sealing position, and for connecting said first cavity with said first opening when being in said release position;
   a first biasing means for biasing said first piston toward the sealing position, in which the first counter surface of said first piston rests against said first sealing surface;
   a first retaining room extending from said first sealing surface between an inner surface of said first cavity and an outer surface of said first piston remote from said first opening; and
   a first fluid channel connecting the first retaining room to a second end of said first piston remote from said first opening allowing a fluid communication for transferring fluid pressure between said first opening, a first gap formed between said first sealing surface and said first counter surface, said first retaining room and said second end of said first piston, when being in said opening position;
   and wherein said second coupling element comprises:
   a second end face facing the first coupling element;
   a second opening within said second end face extending into a second cavity extending through said second coupling element in axial direction;
   a second piston being guided displaceably in axial direction within said second cavity between a sealing position and an opening position;
   a second sealing surface configured as an inner cone surface extending from said second opening of said second end face into said second cavity;
   a second counter surface being configured as an outer cone surface arranged on a first end of said second piston facing the second end face and coacting with said second sealing surface to seal said second cavity from said second opening, when being in said sealing position, and for connecting said second cavity with said second opening when being in said release position;
   a second biasing means for biasing said second piston toward the sealing position, in which the second counter surface of said second piston rests against said second sealing surface;
   a second retaining room extending from said second sealing surface between an inner surface of said second cavity and an outer surface of said second piston remote from said second opening; and
   a second fluid channel connecting the second retaining room to a second end of said second piston remote from said second opening allowing a fluid communication for transferring fluid pressure between said second opening, a second gap formed between said second sealing surface and said second counter surface, said second retaining room and said second end of said second piston, when being in said opening position;
   wherein with both said first and second end surfaces of said coupling elements resting against each other a fluid pressure in the first retaining room of said first coupling elements acts to move said first piston of said first coupling element against the action of said first biasing means into the opening position, when being sufficient to overcome a certain force exerted by said first biasing means, thereby transferring fluid pressure from said second end of said first coupling element toward said first opening, and thereby shifting said second piston of said second coupling element against the action of said second biasing means into the opening position for transferring fluid pressure toward said second end of said second piston.

2. A coupling device for transferring fluid pressure from a first coupling element to a second coupling element, wherein each of said coupling elements comprises:
   an end face facing the other coupling element;
   an opening within the end face extending into a cavity extending through the coupling element in axial direction;
   a piston being guided displaceably in axial direction within said cavity between a sealing position and an opening position;

a sealing surface configured as an inner cone surface extending from said opening of said end face into said cavity;

a counter surface being configured as an outer cone surface arranged on a first end of said piston facing the end face and coacting with said sealing surface to seal said cavity from said opening, when being in said sealing position, and for connecting said cavity with said opening when being in said release position;

a biasing means for biasing said piston toward the sealing position, in which the counter surface of said piston rests against said sealing surface;

a retaining room extending from said sealing surface between an inner surface of said cavity and an outer surface of said piston remote from said opening; and a fluid channel connecting the retaining room to a second end of said piston remote from said opening allowing a fluid communication for transferring fluid pressure between said opening, a gap formed between said sealing surface and said counter surface, said retaining room and said second end of said piston, when being in said opening position;

wherein a fluid pressure in the retaining room of a first one of said coupling elements acts to move the piston of the first coupling element against the action of the biasing means into the opening position, when being sufficient to overcome a certain force exerted by the biasing means.

3. A coupling device for transferring fluid pressure from a first coupling element to a second coupling element, wherein each of said coupling elements comprises:

an end face facing the other coupling element;

an opening within the end face extending into a cavity extending through the coupling element in axial direction;

a piston being guided displaceably in axial direction within said cavity;

a sealing surface extending from said opening of said end face into said cavity;

a counter surface arranged on a first end of said piston facing the end face and coacting with said sealing surface to seal said cavity from said opening, when being in a sealing position, and for connecting said cavity with said opening when being in a release position;

a biasing means for biasing said piston toward the sealing position, in which the counter surface of said piston rests against said sealing surface;

a retaining room extending from said sealing surface between an inner surface of said cavity and an outer surface of said piston remote from said opening; and a fluid channel connecting the retaining room to a second end of said piston remote from said opening allowing a fluid communication for transferring fluid pressure between said opening, said retaining room and said second end of said piston;

wherein a fluid pressure in the retaining room of a first one of said coupling elements acts to move the piston of the first coupling element against the action of the biasing means into the opening position, when being sufficient to overcome a certain force exerted by the biasing means.

4. The coupling device of claim 3, wherein the piston of each one of said coupling elements is terminated at its first end facing the other coupling element by a head surface that faces the other coupling element.

5. The coupling device of claim 4, wherein said head surface of each one of said coupling elements is substantially flush with respect to said end surface of said coupling element, when being in said sealing position.

6. The coupling device of claim 3, wherein said head surface of each one of said coupling elements is recessed with respect to said end surface of said coupling element, when being in said sealing position.

7. The coupling device of claim 3, wherein the fluid channel of each one of said coupling elements connecting the retaining room to the second end of the piston comprises a connecting channel leading from said retaining room into a central fluid channel extending within said piston toward said second end of said piston.

8. The coupling device of claim 3, wherein the piston of each one of said coupling elements comprises a hollow cylindrical extension extending from a head section at said first end of said piston toward said second end of said piston.

9. The coupling device of claim 7, wherein the piston of each one of said coupling elements comprises a hollow cylindrical extension extending from a head section at said first end of said piston toward said second end of said piston, and wherein said connecting channel extends through said head section and said central channel extends through said hollow cylindrical extension.

10. The coupling device of claim 3, wherein said biasing means of each one of said coupling elements is configured as a spring means which is being fixed between a radial surface of the piston and a surface of a terminating element facing the radial surface of the piston, said terminating element being mounted at a side of said wall of said cavity remote from said opening.

11. The coupling device of claim 10, wherein said terminating element comprises a stop surface arranged at a side facing said opening, said stop surface coacting with said radial surface of said piston for limiting the movement of the piston against the action of said biasing means.

12. The coupling device of claim 10, wherein said hollow cylindrical extension comprises an outer surface that is guided displaceably within a bore axially extending through said terminating element.

13. The coupling device of claim 12, wherein a sealing means is provided between said outer surface of said hollow cylindrical extension and said bore.

14. The coupling device of claim 3, wherein the sealing surface of each one of said coupling elements is configured as an inner cone surface extending from said opening toward said retaining room, said counter surface of said piston being configured as an outer cone surface mated thereto.

15. The coupling device of claim 3, wherein each one of said coupling elements comprises a base body comprising a bore and further comprising a coupling insert received within said bore, said cavity being formed within said coupling insert, said end face being formed on an outer side of said coupling insert, said bore terminating at an end remote from said opening in a fluid line extending within said base body for connecting the coupling element to the outside.

16. The coupling device of claim 3, wherein at least one of said coupling elements comprises a sealing element provided at the end face for sealing the region surrounding both openings, when the end faces of both coupling elements rest against each other.

17. The coupling device of claim 3, wherein the biasing device of one coupling element supplying the fluid pressure has a lower retention force than has the biasing device of the other coupling element receiving the fluid pressure from said one coupling element.

* * * * *